Feb. 25, 1969     L. R. BELL ETAL     3,429,124
CAPILLARY TUBE FEED FOR ROCKETS
Original Filed July 26, 1962     Sheet 1 of 2
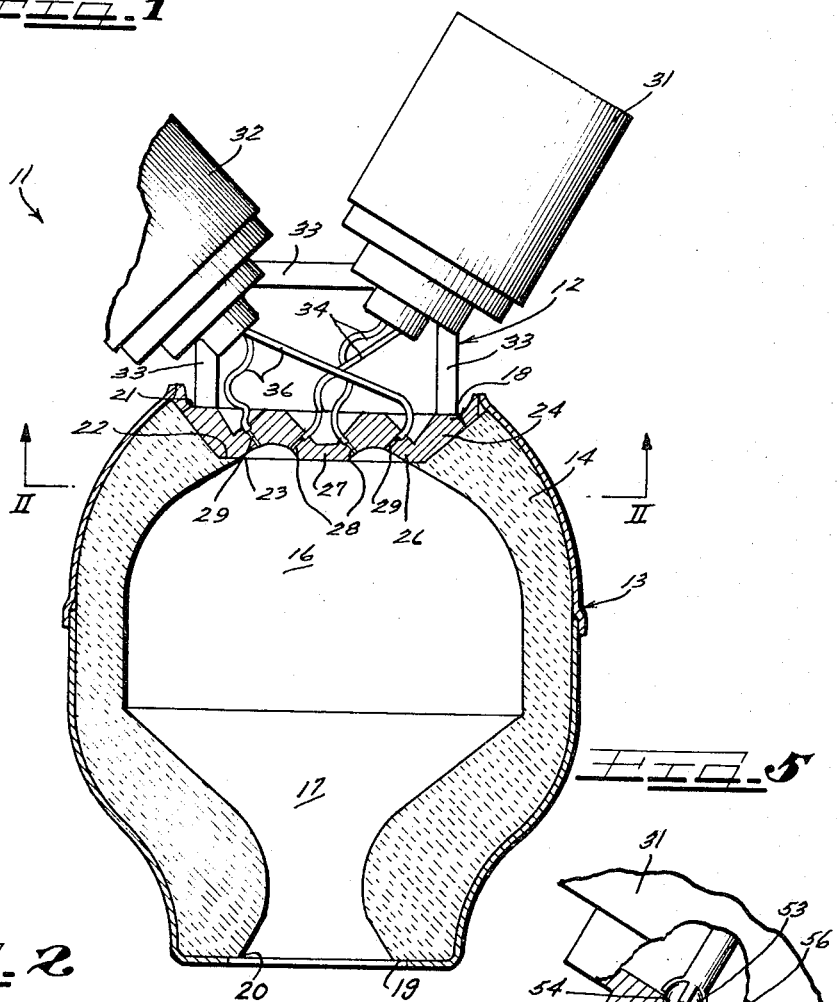
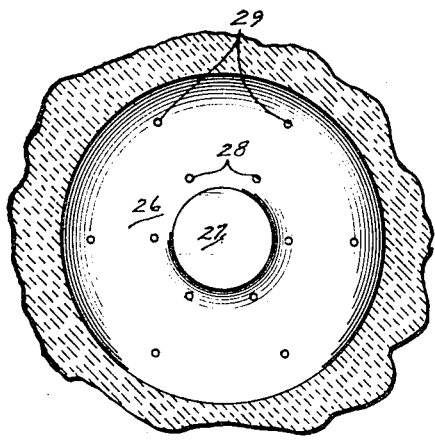
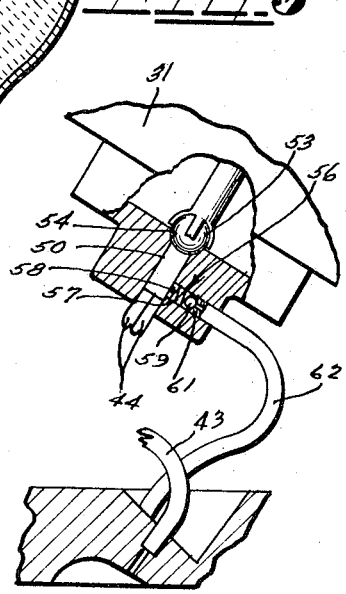
INVENTOR.
LEO R. BELL
JOSEPH A. PETERSON
BY
Hill, Sherman, Meroni, Gross & Simpson
ATTORNEYS

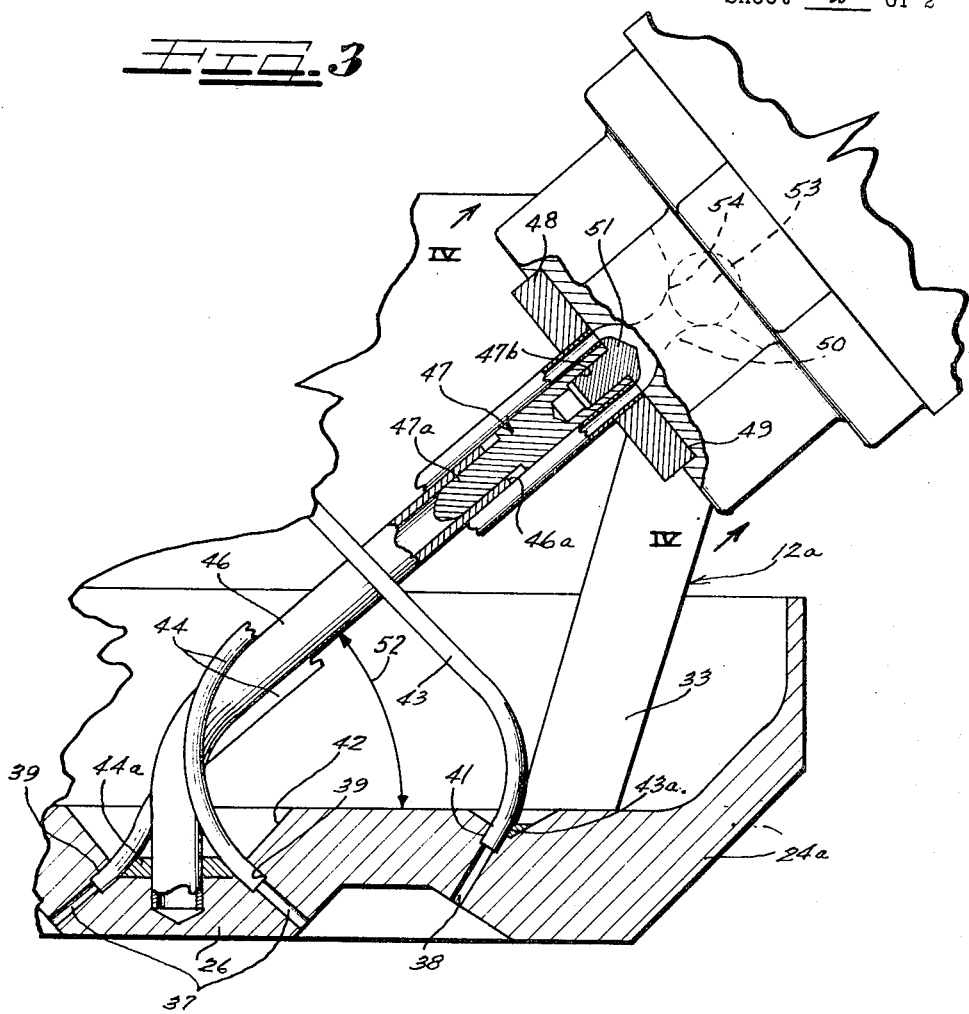
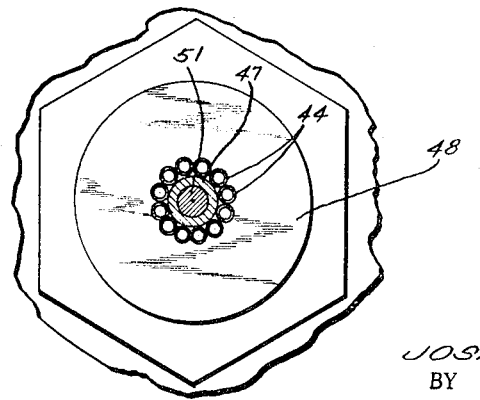

United States Patent Office 3,429,124
Patented Feb. 25, 1969

3,429,124
CAPILLARY TUBE FEED FOR ROCKETS
Leo R. Bell, Sherman Oaks, and Joseph A. Peterson, Long Beach, Calif., assignors to TRW Inc., a corporation of Ohio
Continuation of application Ser. No. 212,679, July 26, 1962. This application Sept. 15, 1966, Ser. No. 579,779
U.S. Cl. 60—258                                          7 Claims
Int. Cl. F02k 9/02, 7/02

ABSTRACT OF THE DISCLOSURE

A pulsing rocket motor having fuel and oxidizer valves spaced from the injector head to provide a heat barrier. The propellant lines between the valves and the injector are of small diameter and thickness to maximize radiation and minimize heat conduction. These lines may be bundled, and a vacuum breaker line and valve may be provided to minimize dribbling after a propellant valve is closed.

---

This application is a continuation of application Ser. No. 212,679, filed July 26, 1962, now abandoned.

This invention generally relates to pulsing rocket motors and more particularly relates to attitude rocket motors that receive thrust gas producing hypergolic reacting fuel and oxidizers for selected periods of time.

The invention will hereinafter be specifically described as embodied in small rocket motors for controlling the attitude of orbiting vehicles relative to the earth, but it should be understood that motors of this invention are generally useful for any type of vehicle.

It is critical in attitude rocket motors that the rocket motors produce a minimum impulse bit for a predetermined time. Anything over the minimum impulse bit produces "over-control" or "hunting" of the space vehicle the attitude rocket motors are controlling. This hunting and over-control wastes valuable fuel and oxidizers as well as preventing accurate control of the space vehicle. In space vehicles, only a very small amount of impulse is needed to correct the attitude of the space vehicle. A problem, which prevented the control of this small amount of impulse in attitude rocket motors, arose from the inability of the rocket motors to prevent the transfer of heat from their body to their fuel delivery means and also from the inability to instantaneously and thoroughly mix their fuel with the correct amount of impinging oxidizer. Heat from the rocket motor body caused the fuel to vaporize and thereby prevent accurate control of the amount of fuel being supplied to the rocket motor combustion chamber. Also, this heat caused the fuel regulating valves to stick and thereby again prevent accurate control of the fuel delivery. Further, the complete and efficient combustion of the fuel and oxidizer was prevented by the use of a single or large fuel delivery means which did not allow instantaneous and thorough mixing of fuel and oxidizer thus wasting a portion of the fuel and oxidizer.

The present invention eliminates the heat transfer and instantaneous mixing problems of known attitude rocket motors utilizing fuel and oxidizer injectors.

While the rocket motors as hereinafter specifically described are quite small and are used for attitude control of orbiting vehicles, it is obvious that larger motors could be used for propelling a rocket vehicle without departing from the principles of this invention.

Therefore it is an object of this invention to provide an attitude control rocket motor that is selectively actuated for a desired period of time having its own fuel and oxidizer injectors mounted thereon.

It is another object of this invention to provide a chemical attitude rocket motor having fuel and oxidizer injectors mounted thereon and being provided with a heat dam or heat barrier between the rocket motor body and the fuel and oxidizer injectors.

It is still another object of the present invention to provide chemical attitude rocket motors having a fuel injector mounted thereon and being provided with a plurality of fuel conduits leading from the fuel injector to the rocket motor combustion chamber.

It is still another object of the present invention to provide attitude rocket motors having a fuel injector thereon with a heat barrier between the fuel injector and the rocket motor body and a plurality of capillary fuel delivery tubes connecting and communicating the fuel injector with the rocket motor combustion chamber.

It is still another object of the present invention to provide a method of mounting a plurality of capillary fuel feed tubes between a rocket motor body and fuel injector mounted on rocket motor body wherein the fuel injector is separated from the rocket motor body by a heat barrier or heat dam.

Other and further objects of this invention will be apparent to those skilled in the art from the following detailed description of the annexed sheets of drawings which by way of a preferred example only illustrate three embodiments of the present invention.

On the drawings

FIGURE 1 is a partial longitudinal cross-sectional view of the atttitude rocket motor of the present invention with parts in elevation;

FIGURE 2 is a partial transverse cross-sectional view taken along the lines II—II of FIGURE 1;

FIGURE 3 is a partial longitudinal cross-sectional view of another embodiment of a rocket motor head section of the present invention with parts in elevation;

FIGURE 4 is a transverse cross-sectional view taken along the lines IV—IV of FIGURE 3; and FIGURE 5 is a partial longitudinal cross-section of another embodiment of the rocket motor head section of the present invention with parts in elevation.

As shown on the drawings

In accordance with this invention a plurality of attitude rocket motors are mounted on a space vehicle. These motors are of the chemical reaction type and are fed with hypergolic reacting fuel such as hydrazine and mixtures of hydrazine and with oxidizer such as red fuming nitric acid or $N_2O_4$. The fuel and oxidizer used to control the attitude rocket motors of the present invention may also be the fuel and oxidizer used to propel the main rocket motor of the space vehicle.

Referring to FIGURE 1 there is illustrated an attitude rocket motor 11 having a rocket motor head section 12 interfitted to a rocket motor body section 13. The body section 13 has a tubular wall 14 defining a combustion chamber 16 and a converging-diverging rocket nozzle 17. The tubular wall 14 has a pie-pan feed end wall 18 having a frusto-conical wall 21 converging to an inwardly extending transverse shoulder 22 which defines an open circular feed end 23 communicating with the combustion chamber 16. The head section 12 is mounted on the rocket motor body 13 by seating a feed orifice plate 24 on the shoulder 22 and coextensive with the frusto-conical wall 21.

Opposite the feed end wall 18 is an exhaust end wall 19 defining a nozzle exit opening 20 for discharge of combustion gases flowing through the nozzle 17.

An orifice feed plate 24 defines an annular groove 26 and a central frusto-conical nipple protrusion 27 facing the combustion chamber 16. Bore through the side walls of the protrusion 27 are six fuel delivery passageways 28. Bored through the orifice plate and the side of annular groove 26 facing the fuel delivery passageways 28 are six oxidizer delivery passageways 29. The fuel and oxidizer delivery passageways are paired-off and are at a predetermined angle and size for impingement of the correct amount of oxidizer and fuel within the rocket motor combustion chamber 16 to afford instantaneous and complete combustion. All the oxidizer and fuel passageways are counterbored opposite the end facing the combustion chamber 16 to provide cavities for mounting capillary tubes.

A fuel solenoid valve operated injector 31 and an oxidizer solenoid operated valve injector 32 are mounted to the orifice feed plate by mounting braces 33. The braces 33 maintain the injectors a predetermined distance away from the rocket motor body 13 and the orifice feed plate 24. Thus, a heat barrier or heat dam is provided between the rocket motor body and the injectors.

The heat dam or heat barrier between the rocket motor body and the fuel and oxidizer injectors provides the necessary accurate control required in pulsing rockets. In pulsing rockets there is desired a minimum impulse which is obtained by delivering just the necessary small amount of fuel and oxidizer to produce the impulse that will correct the attitude of the space vehicle. This accurate control with pulsing attitude rocket motors prevents "over-control" and "hunting" of the space vehicle as well as conserving fuel and oxidizer. The heat dam or heat barrier prevents heat transferring from the combustion chamber 16 through the rocket body 13 and orifice feed plate 24 to the fuel and oxidizer injectors 31 and 32. The high temperatures of the combustion chamber, if transferred to the fuel and oxidizer injectors, would cause the solenoid valves to stick and also would vaporize fluid and oxidizer within the injectors. The vaporization of fuel and oxidizer and the sticking of the solenoid valves would cause the injectors to deliver an incorrect amount of fuel and oxidizer to the combustion chamber and thus prevent accurate determination of the impulse bit.

The fuel and oxidizer injectors are "on-off" solenoid valve controlled and are either fully open or fully closed. Each valve is operated in response to a signal means which may either be from an earth bound signal station or from the cockpit of the space vehicle. The required impulse is determined by the amount of time the fuel and oxidizer injector valves remain in the open position.

In order to provide extremely accurate control the attitude rocket motor of the present invention is provided with a plurality of capillary fuel feed tubes 34 joining the fuel injector 31 to the fuel passageways 28 and a plurality of capillary oxidizer feed tubes 36 joining the oxidizer injector 32 to the oxidizer passageways 29. As used herein, the term "capillary tube" is intended to specify a tube of relatively small size and is not intended to indicate that any capillary action is being performed. The plurality of tubes employed are intended to provide the same flow of fuel and oxidizer as would be provided by a single tube for each of the fuel and oxidizer injector valves.

The use of a number of small tubes for transport of either oxidizer or fuel serves two major purposes. If, for instance, two such tubes are employed to deliver the same amount of fuel as would be delivered by a single tube, the total circumference of the two tubes would be 1.414 times larger than the circumference of the single tube. That is, the use of two tubes rather than one which present the same cross-sectional area, will have an area for heat radiation which is 1.414 times as great as that of the larger tube. With each additional tube employed in the transfer of propellant, the total surface area for heat dissipation is increased. Since heat transfer is increased by both radiation and conduction, the increased surface area radiates more heat to external surroundings and conducts more heat internally to the propellants entering the combustion chamber. Hence, the injector valve is cooled by the process. The second purpose realized by the use of a number of small tubes for transport of either oxidizer or fuel is that more efficient transport is provided for producing small pulse widths. That is, the propellants enter the tubes and leave without sharp changes in direction and the momentum of the liquid streams (traveling at approximately 40 or 50 feet per second) is sufficient to empty the tube without undue delay or flow disturbance. In the case of a single tube where propellant is delivered to a number of drilled holes by means of a manifold or "header," the fluid must abruptly change direction and increase "dribble" time of liquids after shutoff of the injector valves due to increased friction and flow coefficient effects. All the fuel capillary tubes 34 are of the same length and size so that an equal amount of fuel is delivered to each capillary tube. This is also true of all of the oxidizer capillary tubes 36 which have the same length and size. As was pointed out above, the ratio of the fuel and oxidizer tube length and diameters are predetermined to deliver the minimum impulse bit. Due to acceleration of the motor upon delivery of fuel and oxidizer to the combustion chamber, and since there are no sharp bends in the tubes, they will tend to empty on their own momentum.

Efficient fuel and oxidizer combustion requires fast and thorough mixing which is obtained by the provision of having a large number of fuel and oxidizer delivery passageways impinging fuel and oxidizer in the combustion chamber 16. To insure accurate and determinable amounts of fuel and oxidizer being delivered to their respective passageways a plurality of predetermined size capillary tubes connect the respective fuel passageways with the fuel injector and the oxidizer passageways with the oxidizer injector. This connection of the fuel and oxidizer passageways with the fuel and oxidizer injectors not only provides fast and thorough mixing of the oxidizer and fuel in the combustion chamber when the injector valves are open but also prevents dribbling of fuel or oxidizer into the combustion chamber when the valves are closed. Dribbling of oxidizer and fuel when the valves are closed, causes an unwanted impulse bit in the attitude rocket motor that misorientates the space vehicle.

The attitude rocket motor of the present invention provides a feed system which will accurately produce a minimum impulse bit and has minimum lag when the rocket motor is shut-off. The plurality of capillary tubes and the plurality of feed passages on the attitude rocket motor of the present invention allows the first drop of fuel to impinge on the first drop of oxidizer and also the last drop of fuel to impinge on the last drop of oxidizer and thus uses the fuel and oxidizer to their maximum efficiency.

The number of delivery passages and capillary tubes may be varied as desired. Referring to FIGURES 3 and 4 there is illustrated another embodiment of the attitude rocket head section of the present invention. A head section 12a utilizes an orifice plate 24a having 12 fuel delivery passageways 37 bored therethrough and 12 oxidizer delivery passageways 38 bored therethrough. The oxidizer and fuel passageways 37 and 38 are bored at an angle and are of a predetermined size so that they impinge at a predetermined distance within the rocket motor combustion chamber and at a predetermined rate to afford instantaneous combustion. The fuel passageways and oxidizer passageways have respective counterbores 39 and 41 at their ends opposite the ends facing the rocket motor combustion chamber. A frusto-conical cavity 42 is provided on the top side of the protrusion 26 in the central portion thereof.

Fuel capillary tubes 44 are placed within the counterbore 39 and nickel brazed at 44a to the orifice plate 24a. The oxidizer capillary tubes 43 are likewise placed in the counterbore 41 and nickel brazed at 43a thereto.

The following description will be described in connection with mounting the fuel capillary tubes 44 to the fuel injector. It being of course understood that the oxidizer capillary tubes may be mounted in a similar or equivalent manner.

Mounted in the cavity 42 is a bundle tube 46. The bundle tube is inserted down the center of the fuel tubes 44 into the base of the cavity 42 and nickel brazed at 44a to the orifice plate 24a. The bundle tube is straight and extends perpendicular to the orifice plate 24a and the fuel tubes extend parallel to the bundle tube.

A slip joint 47 having a stem 47a at one end and a cavity 47b defined by the other end has the stem 47a inserted in the free end 46a of the bundle tube 46 and is not bottomed in the bundle tube. A fuel connector 48 is forced over the fuel tubes 44 and the cavity end of slip joint 47 until the boss side 49 thereof is flush with the top of the fuel tubes and slip joint cavity end. The resulting assembly is nickel brazed to form a complete leak-tight assembly between the connector 48, the fuel tubes 46 and the slip joint 47. The holes in the fuel tubes 44 and the slip joint cavity 47b are deburred. A fuel flow diffuser 51 is then pressed into the joint cavity 47b. The diffuser divides an injector fuel delivery passageway 50 into twelve passages that communicate with the twelve capillary fuel tubes 44.

Then the connector 48 is twisted 180° either clockwise or counterclockwise, as close as possible to the orifice plate 24a, and the fuel tubes 44 are twisted around the bundle tube 46. The resulting bundle is held straight and firmly from the bottom of fuel connector for approximately 0.75 minute and then bent to provide the desired angle 52. The angle 52 is measured between the top surface of the orifice plate 24a and the center line through the slanted portion of the bundle tube 46. The angle used for illustrative purposes is approximately 40°. Finally, the boss side of the connector 48 is affixed to the fuel injector 31. The fuel injector 31 is a solenoid operative fuel injector utilizing a sapphire ball valve 53 in opening and closing engagement with a valve seat 54 defined by one end of the fuel delivery passage 50.

In operation, the injectors 31 and 32 simultaneously receive an opening signal from a remote source and the valve 53 in each injector moves away from its valve seat 54. Fuel and oxidizer then flow through their respective injector delivery passage 50 and there diffused by the diffuser 51 into a plurality of streams communicating with their respective plurality of fuel and oxidizer capillary tubes. The capillary tubes impinge fuel and oxidizer in the rocket motor combustion chamber. The relative size of the oxidizer tubes and the fuel tubes assumes the correct ratio and rate of impinging fuel and oxidizer for complete combustion and regulated impulse.

When the desired impulse is obtained the fuel and oxidizer injector are simultaneously sent a closing signal which stops the flow of fuel and oxidizer to their respective plurality of capillary tubes.

Referring to FIGURE 5, there is illustrated another embodiment of the present invention wherein the valve head is provided with a vacuum breaker 56. The vacuum breaker is illustrated as being connected to the fuel injector 31 however, it is of course understood that the vacuum breaker may also be attached to the oxidizer injector 32 if desired. The vacuum breaker provides the capillary tubes with complete drainage during operation of the fuel injector and prevents dribbling of fuel and oxidizer when the injectors are closed.

The vacuum breaker 56 is formed by boring a transverse hole 57 through the fuel injector 31 communicating with the fuel delivery passage 50. Mounted within the hole 57 is a compressed spring 58 holding a ball valve 59 in normally closed relation with a passaged valve seat 61. Mounted within the hole and opposite the delivery passage 50 is a conduit 62 that is nickel brazed to the orifice plate 24a and communicates with fuel delivery passages 50 with the attitude rocket motor combustion chamber.

In operation, the vacuum breaker 56 is normally in the closed position. When the injector receives the opening signal, fuel delivered to the delivery passage 50 aids in urging the ball valve 59 against the valve seat 61 and maintains the communication of the passage 50 with the conduit 62 closed.

The spring 58 is calibrated so that it will urge the ball in closing relation with the valve seat 61 and maintain this relation against the back pressures from the combustion chamber when aided by the fuel delivery pressure. However, when the valve 53 is closed, vacuum is created in the passage 50, and this along with the back pressure from the combustion chamber through the line 62 will open the ball valve 59 and accommodate the fuel in the fuel capillary tubes to empty into the combustion chamber.

The conduit 62 is sized so that it has a maximum heat dissipation area that cools any combustion gases delivered to the fuel delivery passage 50.

It should be understood that the vacuum breaker is not an essential requirement in order to empty the fuel and oxidizer tubes upon shutoff of the injector valves. The vacuum breaker merely serves to further reduce dribble volume, an essential requirement for a pulsing rocket. That is, a vacuum breaker at the point shown in the injector valve essentially eliminates the fluid trapped in the valve and prevents this fluid from becoming part of the dribble volume. When the injector valve receiving the closing signal and the ball valve 53 closes, the pressure in the cavity 50 begins to decay. At some given point, dependent on the calibrated spring force of the spring 58, the combustion chamber pressure will exceed the sum of forces of the fluid in the cavity 50 and the spring force and the ball 59 will be removed from its seal 61. Due to the acceleration of the motor a reaction force exists which assists in unseating the ball 59 and in moving the propellant through the tubes 43, 44. Thus, the vacuum breaker will aid in removing liquid trapped in the capillary tubes, reducing dribble time and increasing the short pulse capability of the engine.

The case exists in which the supply pressure and flows are different for oxidizer and fuel. In addition, experience shows that lead-lag effects exist between electrical valves of the same design and consequently, the opening and closing of the valves with pressure applied are not exactly synchronized and one of the valves may open and close prior to the opening and closing of the other. In this event, it may be advisable to use the vacuum breaker on the last valve to close which would aid in removing the liquid from that portion or half of the engine, while the other portion of the engine operates without the vacuum breaker. Thus, the two propellant streams could, by this method, be meticulously synchronized.

For the above description it will therefore be understood that this invention now provides for accurate control of the attitude of orbiting vehicles by control of the duration of operation of the small attitude rocket motors which are so positioned on the vehicle that thrust therefrom will be delivered in directions forcing the vehicle to change its attitude relative to the earth. The attitude of the vehicle is instantaneously changed to the desired attitude without any vehicle "hunting" or "over-control."

Although various minor modifications might be suggested by those versed in the art, it should be understood that I wish to embody within the scope of the patent warranted hereon all such embodiments as reasonably and properly come within the scope of my contribution to the art.

What is claimed is:

1. A rocket motor having a head section and a body section wherein said body section defines a rocket motor nozzle and a combustion chamber with said head section and said heat section comprises:

an orifice plate defining two sets of apertures,
said orifice plate being mounted on said body section,
each aperture of one set of apertures being paired-off with an aperture of the other set of apertures,
each aperture of said one set of apertures having its axial centerline intersecting the axial centerline of a respective aperture of the other set of apertures a predetermined distance within said combustion chamber, fuel and oxidizer injector valves mounted on said orifice plate spaced therefrom by a heat barrier, the fuel and oxidizer injector valves having delivery passageways that are opened and closed by on-off valves, a bundle of tubes connected to said orifice plate, a plurality of capillary fuel tubes connected to the one set of orifice plate apertures, a fuel connector connecting said fuel capillary tubes to said bundle tube wherein said bundle tube is centrally located between said fuel capillary tubes and said fuel capillary tubes being wrapped around said bundle tube, said fuel connector being mounted to said fuel injector valve so that said fuel capillary tubes communicate with said fuel injector delivery passageway and deliver fuel to the combustion chamber, a plurality of capillary oxidizer tubes connecting the other set of orifice plate apertures to the oxidizer injector delivery passageway to deliver oxidizer to the combustion chamber in impinging relation with the fuel being delivered by said fuel injector valve, whereby the rocket motor is provided with an accurate predetermined amount of fuel and oxidizer that produces a minimum impulse bit.

2. A rocket motor having a rocket body defining a combustion chamber and a nozzle comprising:

a fuel injector valve mounted on the rocket motor body, means defining a fuel injector delivery passageway connected to said fuel injector valve, a plurality of fuel delivery capillary tubes connecting the fuel injector delivery passageway with the combustion chamber, a vacuum breaker conduit communicating between the combustion chamber of the fuel injector delivery passageway, and a vacuum breaker valve in said vacuum breaker conduit to insure complete drainage of the capillary tubes when said fuel injector valve is closed, whereby the rocket motor is provided with an accurate predetermined amount of fuel and oxidizer that produces a minimum impulse bit.

3. An attitude rocket motor having a rocket body defining a combustion chamber and a nozzle comprising:

a fuel injector valve mounted on the rocket motor body, a heat conduction barrier between the fuel injector valve and the rocket motor body including bracing means supporting said fuel injector valve a spaced distance from the rocket motor body and having a relatively small cross-sectional area to provide a low conduction path, and a plurality of tubes connected between said fuel injector valve and the combustion chamber, a vacuum breaker conduit connected from between one of said plurality of tubes and said fuel injector valve to the combustion chamber, and a vacuum breaker valve in said vacuum breaker conduit to insure complete drainage of said one tube when said fuel injector valve is closed.

4. A rocket motor which comprises:

a body defining a combustion chamber and a nozzle for delivering thrust gases from said chamber, a plurality of propellant delivering orifices in said combustion chamber, a propellant flow control valve, a plurality of small capacity tubes, each of said tubes connecting said valve with one of said orifices, said tubes having a combined cross-sectional area equal to that required of a single tube for transporting the same amount of fuel, said tubes further having a combined surface area greater than that of such a single tube, whereby to facilitate dissipation of heat.

5. A rocket motor according to claim 4 and further including bracing means supporting said control valve a spaced distance from said body and having a relatively small cross-sectional area to provide a low heat conduction path.

6. A rocket motor according to claim 4 and further including a second control valve and a second plurality of small capacity tubes, each of said tubes connecting said second valves with one of said orifices, each of said second tubes having a combined cross-sectional area equal to that required of a single tube for transporting the same amount of propellant, said second tubes further having a combined surface area greater than that of such a single tube, whereby to facilitate dissipation of heat.

7. A rocket motor according to claim 6 wherein the orifices corresponding to said first tubes and said second tubes cooperate to impinge together streams of propellant.

References Cited

UNITED STATES PATENTS

| 2,558,483 | 6/1951 | Goddard | 60—35.6 |
| 2,868,127 | 1/1959 | Fox | 60—35.6 |
| 2,890,843 | 6/1959 | Attinello. | |
| 3,076,311 | 2/1903 | Johnson | 60—39.28 |
| 3,088,406 | 5/1963 | Horner | 60—35.6 |

MARTIN P. SCHWADRON, *Primary Examiner.*

DOUGLAS HART, *Assistant Examiner.*